(12) United States Patent
Gonzalez et al.

(10) Patent No.: US 6,946,063 B1
(45) Date of Patent: Sep. 20, 2005

(54) DETERIORATION RESISTANT CHAMBERS FOR INDUCTIVELY COUPLED PLASMA PRODUCTION

(75) Inventors: Juan Jose Gonzalez, Fort Collins, CO (US); Steve Dillon, Fort Collins, CO (US); Andrew Shabalin, Fort Collins, CO (US); Justin Mauck, Fort Collins, CO (US); Fernando Gustavo Tomasel, Fort Collins, CO (US)

(73) Assignee: Advanced Energy Industries, Inc., Fort Collins, CO (US)

( * ) Notice: Subject to any disclaimer, the term of this patent is extended or adjusted under 35 U.S.C. 154(b) by 205 days.

(21) Appl. No.: 10/374,306

(22) Filed: Feb. 25, 2003

Related U.S. Application Data

(63) Continuation-in-part of application No. 10/284,821, filed on Oct. 31, 2002, now Pat. No. 6,802,366.

(51) Int. Cl.$^7$ .......................................... C23C 14/34
(52) U.S. Cl. ......................... 204/298.06; 156/345.35; 315/111.21
(58) Field of Search ...................... 315/111.21–111.81; 204/298.06, 298.07, 298.16, 298.19; 156/345.35, 156/345.48, 345.49; 118/723.1 R, 723.1

(56) References Cited

U.S. PATENT DOCUMENTS

| | | | |
|---|---|---|---|
| 6,203,620 B1 * | 3/2001 | Moslehi | 118/723 R |
| 6,679,981 B1 * | 1/2004 | Pan et al. | 204/298.06 |
| 6,815,633 B1 * | 11/2004 | Chen et al. | 156/345.38 |

* cited by examiner

Primary Examiner—Wilson Lee
(74) Attorney, Agent, or Firm—Gordon Lindeen

(57) ABSTRACT

In one aspect of the invention is a method to construct plasma chambers with improved wall resistance to deterioration. In one embodiment of the invention, a chamber is made of an aluminum alloy having low concentrations of elements that form non-soluble, intermetallic particles to address coating/substrate issues, has swaged-in cooling tubes to reduce thermal stress by improving thermal resistance, and has a plurality of dielectric gaps to decrease ion bombardment.

30 Claims, 15 Drawing Sheets

DETERIORATION RESISTANT CHAMBERS FOR INDUCTIVELY COUPLED PLASMA PRODUCTION

This application is a continuation-in-part of application Ser. No. 10/284,821, filed on Oct. 31, 2002, now U.S. Pat. No. 6,802,366 entitled "Swage Method for Cooling Pipes", and claims priority therefrom.

BACKGROUND OF THE INVENTION

1. Field

Embodiments of this invention relate to the field of failure mechanisms found in chambers for inductively coupled plasma production, and more specifically, to a plasma chamber with an anodic coating with improved resistance to deterioration.

2. Description of Related Art

Inductively coupled plasmas (ICP) are routinely used in a number of different applications including production of activated gases, pollutant abatement and many others. In such devices, a coil is placed in close proximity to, around or within a vacuum chamber. When the coil is excited with radio frequency (RF), the electromagnetic fields induced around the coil sustain a gas plasma discharge within the vacuum apparatus. The plasma is coupled to the coil either through the air or through a magnetic core. In the latter case, the sources are called transformer coupled plasma (TCP) sources. The vacuum chamber is often a metal vessel that usually includes one dielectric gap to avoid the creation of a closed current loop through the chamber. As the metallic chamber is highly conductive, most of the induced voltage along the chamber drops across this gap.

Aluminum alloy is utilized in the fabrication of inductively coupled reactors for plasma production. During operation of the reactor, the interior of the plasma chamber is subjected to service in plasmas created from gases that are either corrosive, or in which dissociation results into corrosive products. One example of such gases is $NF_3$, where its dissociation products include highly corrosive elements that attack the aluminum walls, such as atomic and ionized fluorine. To improve the resistance of the chamber to fluorine attack, an anodic coating is produced on the inner surface of the chamber.

In the course of plasma processing, surface damage occurs. In the particular case of fluorine attack, two specific types of fluorine attack have been observed: (i) a possible general attack in which the top of the anodized layer is enriched in fluorine (possibly $AlF_x$); and (ii) a more localized attack in which nodules of presumably $AlF_x$ have formed. Furthermore, ion bombardment on the anodized metal housing results in pits that pierces the anodic layer exposing the underlying aluminum alloy substrate.

Factors that contribute to the deterioration of the anodic layer include: thermal stress, substrate imperfections, and ion bombardment, in conjunction with a chemically aggressive environment. Thermal stress relates to the plasma chamber being subjected to high temperatures and cycling. In some cases, peak temperatures in the plasma chamber can rise to the order of 140° C.–150° C. To reduce the temperature in the chamber, pipes can be placed in the plasma chamber, and cooling water run through the pipes.

The second category of factors that relate to damage of the anodic layer can be characterized as substrate-related. Two substrate-related problems appear to be responsible for the degraded performance of anodic coatings. One is the surface preparation prior to the anodization (a parameter controlled by the anodizer), and the other is the quality of the aluminum alloy utilized to manufacture the chamber.

Ion bombardment relates to the high-energy ions bombarding the coated surfaces of the chamber. As mentioned above, due to the chamber configuration and the way the power is coupled into the plasma, a voltage drop appears across the plasma sheath close to the chamber's dielectric break. That voltage drop accelerates the ions that impinge on the surfaces close to the gap.

SUMMARY OF THE INVENTION

In one aspect of the invention is a plasma chamber with improved wall resistance to deterioration. The chamber includes a first housing portion, a second housing portion mated to the first housing portion, and a plurality of dielectric breaks between the first housing portion and the second housing portion.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION OF THE INVENTION

Overview

In one aspect of the invention is a method to construct plasma chambers with improved wall resistance to deterioration. In one embodiment of the invention, a chamber is made of an aluminum alloy having low concentrations of silicon, iron, manganese and chromium to address coating/substrate issues, comprises swaged-in cooling tubes to reduce thermal stress by improving thermal resistance, and comprises a plurality of dielectric gaps to decrease ion bombardment.

Figure 1:
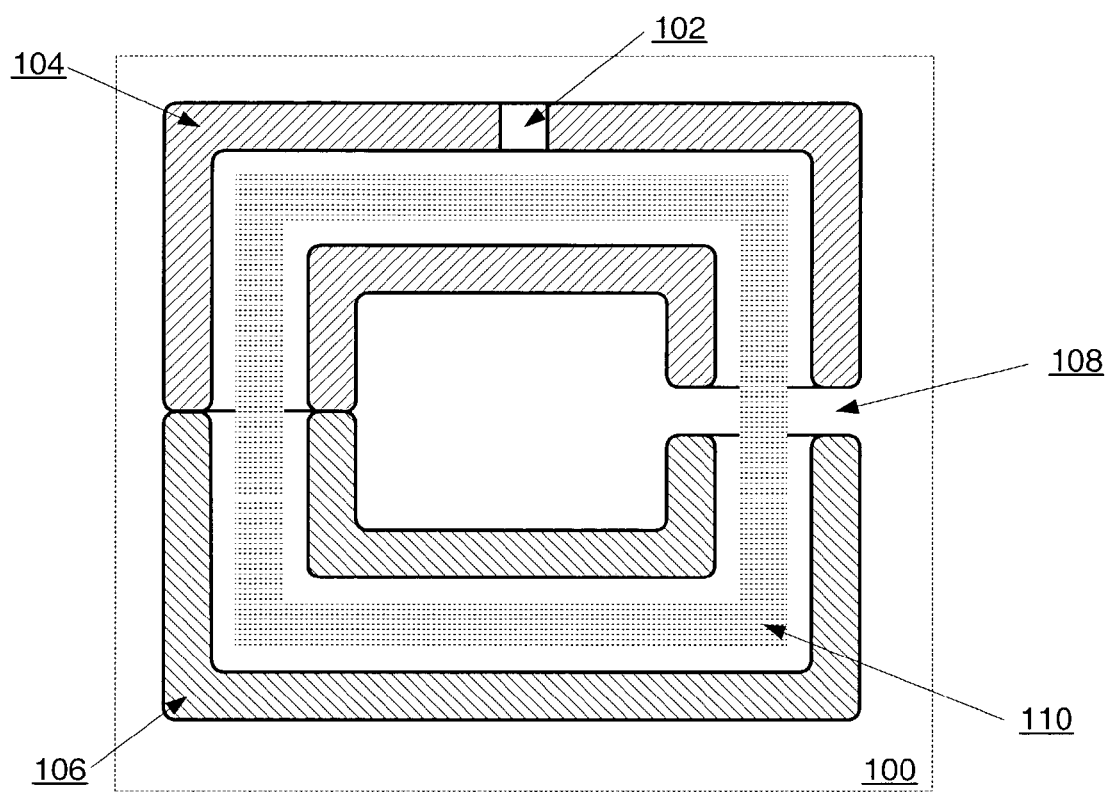
FIG. 1 illustrates a plasma chamber in accordance with general embodiments of the invention.

FIG. 1 illustrates a plasma chamber 100 in accordance with general embodiments of the invention. The plasma chamber 100 is formed from a first housing portion 104, and a second housing portion 106, and comprises at least one dielectric break 108 (only one shown) between the first and second housing portions 104, 106 to prevent induced current flow from forming in the plasma chamber 100. The housing portions 104, 106 are usually made of anodized aluminum.

In steady state operation, the working gas is continuously injected into the gas inlet 102, and interacts with the inductively coupled plasma 110 created within the chamber. As a result, many different molecular, atomic and ionized species can be created. These plasma-created species can then be used for various applications, including chamber cleaning, etching, and deposition.

Part of the energy inductively coupled to the plasma is deposited into the wall in the form of radiation, ion bombardment and exothermic surface reactions, among others. The metal portions of the chamber, when properly coated and cooled, can be made very resistant to plasma-induced damage.

Aluminum alloys may be susceptible to attack by different species present in the plasma chamber. A solution to this problem is to coat the inner surface of the chamber with a protective coating such as an anodic layer. However, certain alloys are not suitable for corrosion resistant anodization due to their high concentration levels of precipitants such as iron (Fe), manganese (Mn), silicon (Si) and chromium (Cr), for example. Intermetallic compound particles such as AlFeSiMnCr do not completely dissolve into the aluminum, creating defects in the anodic coating that result in premature failures under chemical attack.

Therefore, in one embodiment of the invention, an aluminum alloy comprising low concentrations of elements that form non-soluble intermetallic particles such as Fe, Mn, Si, and Cr is coated with a protective anodic layer. To minimize problems related to intermetallic compound particles, the alloy has impurity concentrations significantly lower than those of standard aluminum alloys such as type 6061. For example, the concentrations of Fe, Mn, Si and Cr are significantly lower than approximately 0.70%, 0.15%, 0.4%, and 0.1%, respectively.

Different coatings may be used to coat the substrate. Anodic coating of type I, II, and III are representative examples. In addition to having a high purity alloy coated with an anodic layer, the surface protection may include a layer deposited on top of the anodization coating. This additional protective layer may comprise, for example, a polymer or ceramic coating.

Another problem in plasma processing is related to high-energy ions bombarding the coated surfaces of the chamber. As mentioned above, due to the chamber configuration and the way the power is coupled into the plasma, a voltage drop appears across the plasma sheath close to the chamber's dielectric break. That voltage drop accelerates the ions that impinge on the surfaces close to the gap.

To minimize the effects of ion impingement, a plurality of dielectric breaks and transformers is used in the plasma chamber. As explained below, the implementation of multiple transformers at multiple dielectric breaks distributes the plasma voltage among the dielectric breaks, thus minimizing the voltage drop at any particular dielectric break. Consequently, ion bombardment at each dielectric break is reduced, and damage to the chamber wall is diminished.

Figure 2:
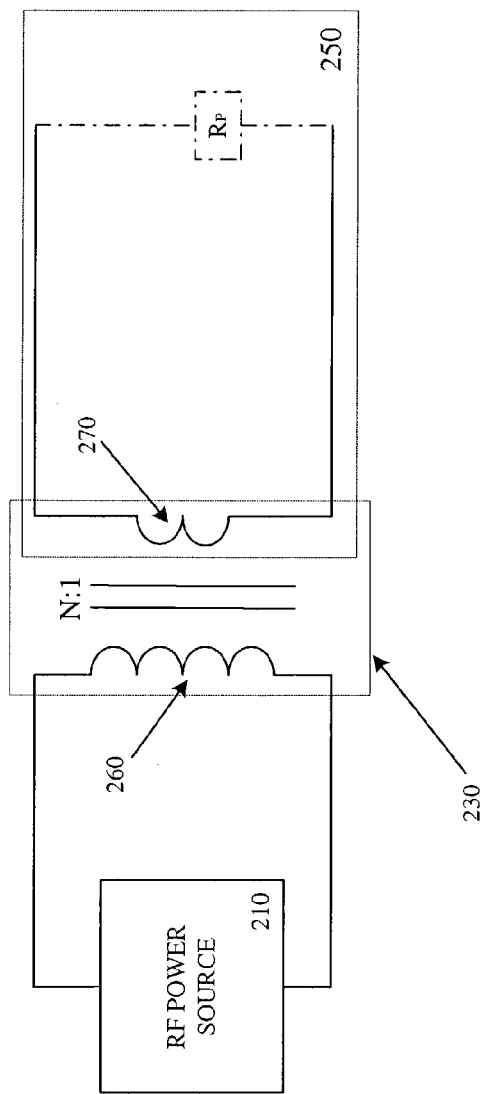
FIG. 2 illustrates an electrical representation of an exemplary TCP apparatus.

FIG. 2 illustrates an electrical representation of an exemplary TCP apparatus. The apparatus includes a RF power supply 210, a transformer 230 and a plasma chamber 250. The primary winding 260 of transformer is coupled to the RF power supply. The secondary winding 270 along with the resistance Rp represent the plasma load.

Figure 3:
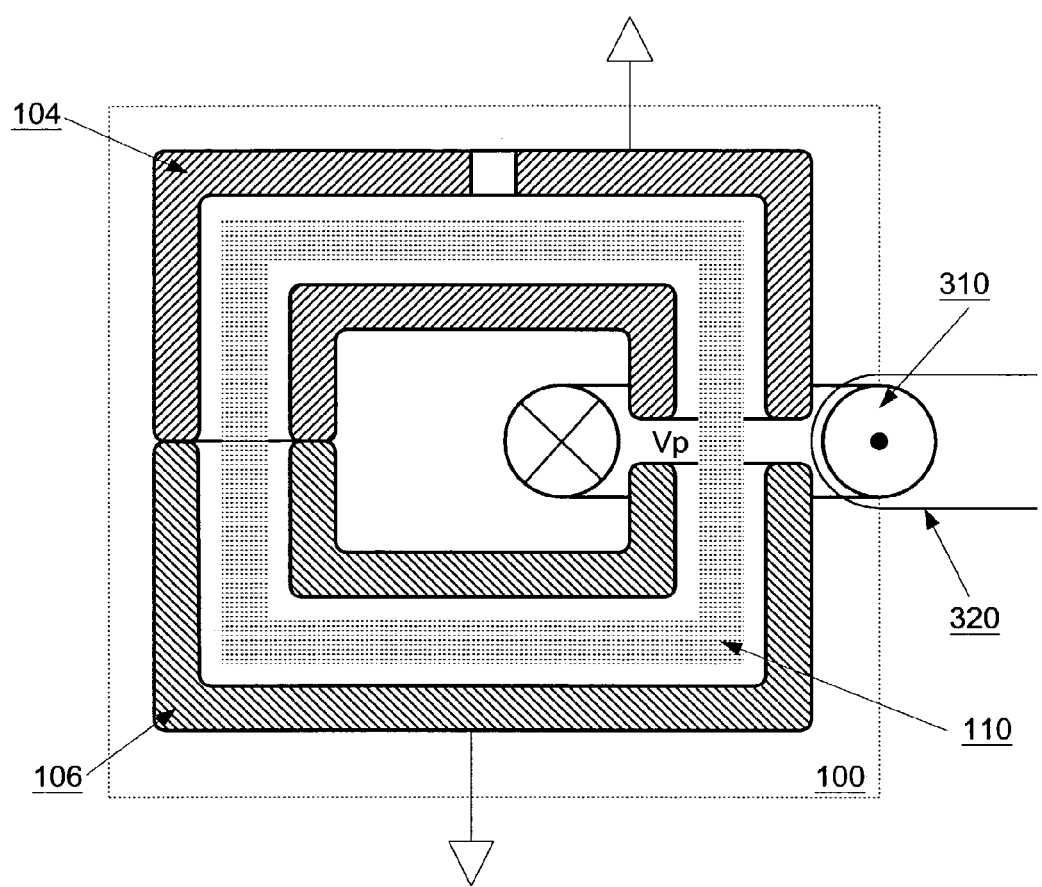
FIG. 3 illustrates an exemplary one-gap, one-transformer plasma source configuration of the TCP apparatus shown in FIG. 1.

FIG. 3 illustrates an exemplary one-gap, one-transformer plasma source configuration of the TCP apparatus shown in FIG. 1. The plasma source includes a chamber with a dielectric break, a transformer with core 310 and primary winding 320, and a plasma loop 110. During chamber operation, the RF excitation on the primary winding of the transformer creates an induced electric field around the transformer core. By Faraday's induction law, for any closed path the total voltage drop associated with this induced electric field is proportional to the net magnetic flux enclosed by the path. Within the vacuum chamber, the induced electric field drives the discharge current, Ip, in a closed loop. The total voltage drop Vp associated with the induced electric field within the chamber is uniformly distributed along the plasma loop. For a closed path following the perimeter of the chamber and across the dielectric break the total flux enclosed is the same as that enclosed by the plasma loop, so the value of the total voltage drop is in both cases the same and equal to Vp. However, since the highly conductive metal forces the electric to be zero in the metallic walls, the total voltage drop Vp appears across the dielectric break.

The voltage appearing across the dielectric gap may cause arcs to occur between the plasma and the chamber walls, causing deterioration of the wall surface. In addition, during plasma operation, ions from the plasma are accelerated by this potential drop, bombarding the chamber wall and increasing the deterioration of the wall through sputtering and enhanced chemical reactions between the energetic ions and the wall material. The deterioration increases as the voltage at the gap increases. Consequently, is it desirable to reduce the voltage in the gap while keeping the driving voltage in the plasma unchanged.

The voltage along the perimeter of the chamber wall and across the dielectric breaks that the chamber may have is equal to the plasma voltage Vp. Therefore, the introduction of more than one dielectric gap could be a means to reduce the voltage drop per gap, provided that the chamber is properly grounded and the excitation transformers are suitably located with respect to the dielectric breaks.

Figure 4:
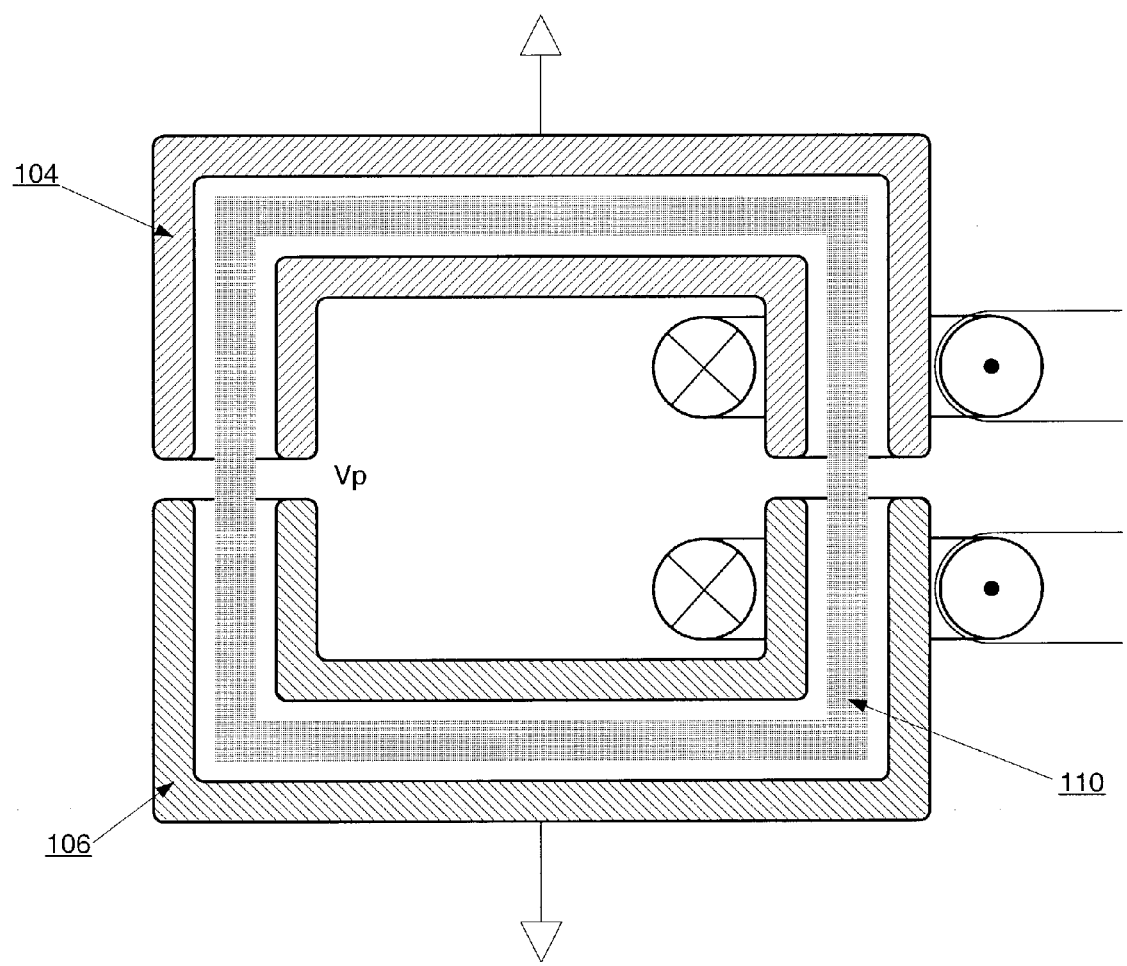
FIG. 4 illustrates an exemplary two-gap, two-transformer plasma source chamber configuration.

FIG. 4 illustrates an exemplary two-gap, two-transformer plasma source chamber configuration. To allow for comparison with the case of a single gap, each of the transformers is assumed to induce a voltage drop equal to Vp/2 along the plasma loop, so the total loop voltage is also Vp. However, the grounding requirements for the chamber do not allow for an even distribution of the total voltage Vp between the two gaps. Typically, the chamber is grounded at the top because of the presence of a gas feed line, and at the bottom because of the pumping line. Grounding both sections and having both transformers close to one of the dielectric gaps results in short circuit across the remaining gap and in the appearance of the full voltage drop Vp across the gap closer to the transformer cores. This conclusion is easy to verify by following a closed path that starts at one edge of the dielectric break on the right, follows the chamber to the upper ground connection, returns by the lower ground connection and goes back to the beginning. Such a path encloses the total magnetic flux of both transformers, so the voltage drop across the dielectric break is equal to the total voltage drop. Consequently, although this configuration features two gaps, there is no split in the voltage between the dielectric breaks. In regard to ion bombardment and wall deterioration, this configuration is essentially equivalent to the one presented in FIG. 3.

Figure 5:
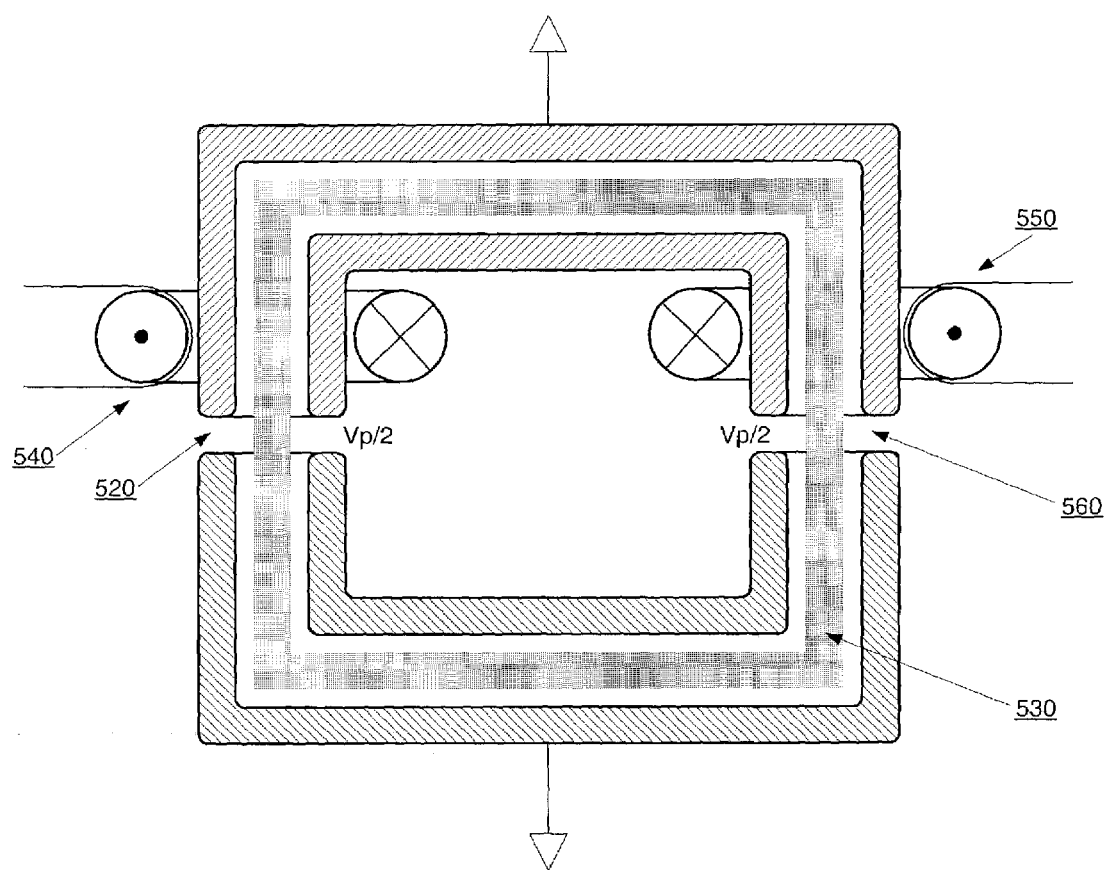
FIG. 5 illustrates one embodiment of a plasma source with decreased ion bombardment damage.

According to one embodiment, the present invention describes a method to distribute the voltage drop among two or more dielectric breaks, thus reducing the ion bombardment and deterioration of the chamber wall close to the gaps. FIG. 5 illustrates one embodiment of a plasma source constructed according to this method.

Referring to FIG. 5, the plasma source includes dielectric breaks 520 and 560, plasma loop 530, and transformers 540 and 550. Transformer 540 is located on the region of chamber 510 next to dielectric break 520, while transformer 550 is located next to dielectric break 560. The transformers are positioned such that the magnetic flux within their cores is directed as indicated in the figure. The crosses and dots drawn inside the cross section of the cores indicate magnetic flows entering and exiting the page, respectively.

During operation, a closed current loop 530 of intensity Ip is established within the chamber. Once again, and to allow comparison with the case of a single gap, each of the transformers is assumed to induce a closed loop voltage equal to Vp/2, so the total voltage drop in the plasma due to the combined effects of both transformers is equal to Vp.

In contrast to the case depicted in FIG. 4, the disposition shown in FIG. 5 makes the voltage drop on each gap equal to Vp/2, even when both sections of the chamber are grounded. This conclusion is easy to verify by following a closed path that starts at one edge of the dielectric break on the right, follows the chamber to the upper ground connection, returns by the lower ground connection and goes back to the beginning. Such a path encloses the magnetic flux of only one transformer, so the voltage drop across the dielectric break is equal to one half of the total voltage drop.

Thus, the voltage is evenly split between dielectric breaks 520 and 560 by the use of a transformer on each side of the chamber. By dividing the voltage between dielectric breaks 520 and 560, the energy of the bombarding ions is diminished, mitigating the deterioration of the chamber wall surface and resulting in extended lifetime for the chamber.

Figure 6:
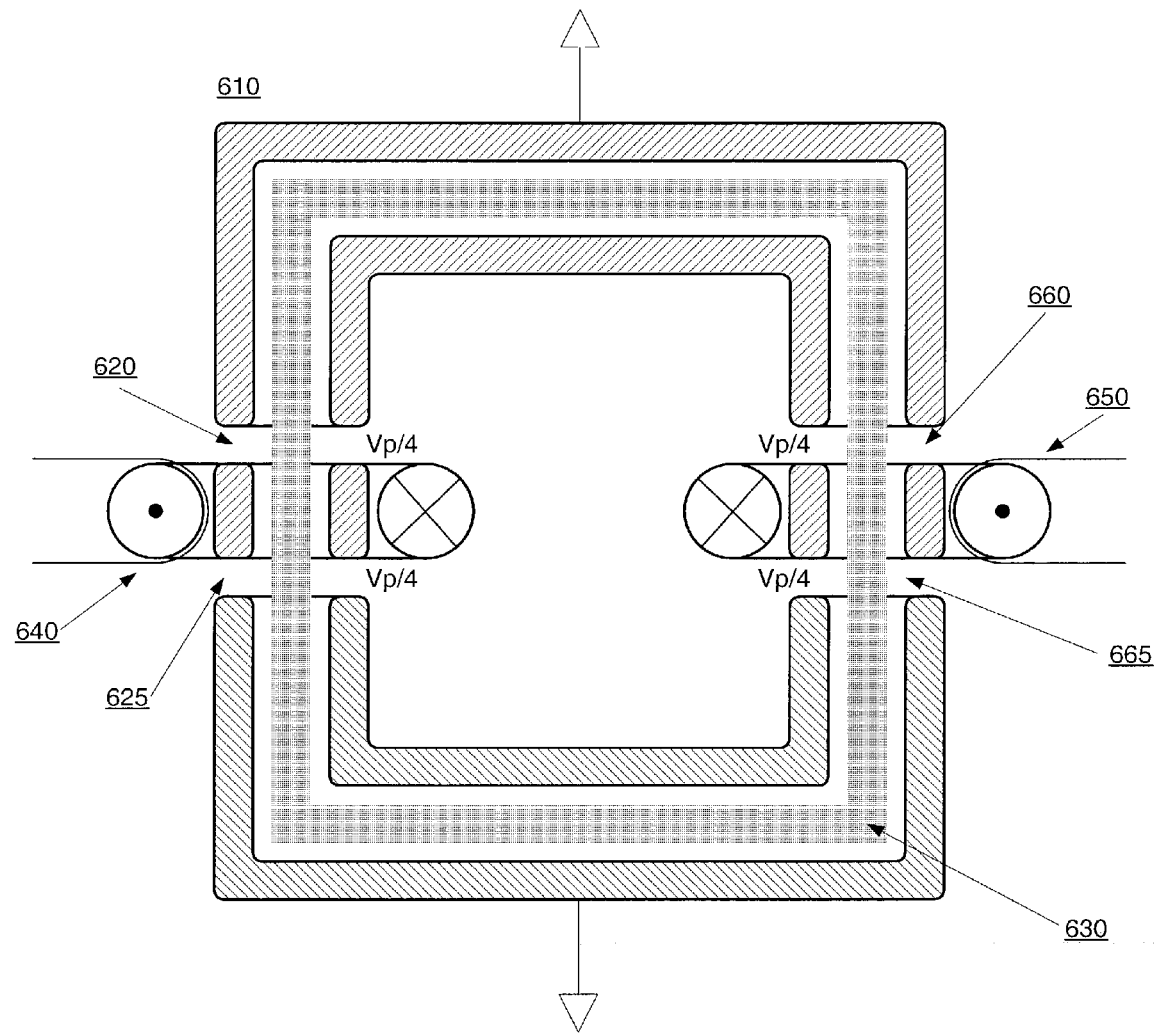
FIG. 6 illustrates another embodiment of a plasma source with decreased ion bombardment damage.

FIG. 6 illustrates another embodiment of a plasma source chamber. In this embodiment, the plasma source comprises a chamber 610, which includes dielectric breaks 620, 625, 660 and 665, plasma loop 630, and transformers 640 and 650. Transformer 640 is located on the region of chamber 610 between dielectric breaks 620 and 625, while transformer 650 is located between dielectric breaks 660 and 665. Each of the transformers induces a closed loop voltage equal to Vp/2, so the total voltage drop in the plasma due to the combined effects of both transformers is equal to Vp. The chamber 610 is grounded at the top and bottom.

When compared to the chamber shown in FIG. 5, the configuration of chamber 610 further divides the total plasma voltage Vp, such that the voltage at each dielectric break is Vp/4. This conclusion is again easy to verify by following a closed path that starts at one edge of the upper dielectric break on the right, follows the chamber to the upper ground connection, returns by the lower ground connection and goes back to the beginning, crossing both gaps on the right side of the chamber. Since such a path encloses the magnetic flux of only one transformer and goes across two gaps, and given the symmetric configuration of each transformer with respect to the closest gaps, the voltage drop across each dielectric break is equal to one quarter of the total voltage drop.

By dividing the voltage between dielectric breaks 620, 625, 660 and 665, energy of the bombarding ions is reduced even further, diminishing the deterioration of the chamber wall surface. Although exemplified for the case of two transformers and two- and four-gap chambers, it is clear that the principle hereby described can be easily extended to the case of a higher number of transformers and gaps.

Figure 7:
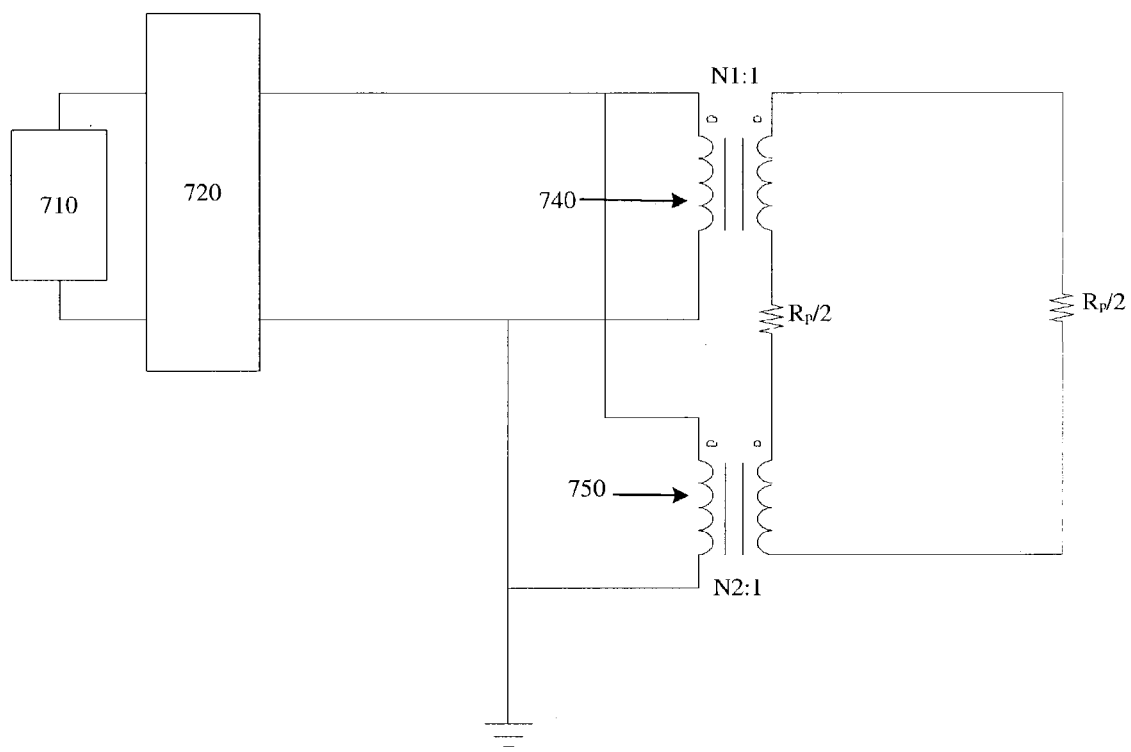
FIG. 7 illustrates an electrical representation of one embodiment of a remote plasma source configuration.

FIG. 7 illustrates an electrical representation of one embodiment of a remote plasma source configuration for chamber 610. The RF generator 710 is coupled through matching network 720 to the primary winding of transformers 740 and 750. According to one embodiment, transformers 740 and 750 are coupled in parallel and connected to ground. The secondary windings of the transformers and the resistances represent the plasma load. Two resistors in series represent the total resistance of the plasma; each resistor is one half of the full loop plasma resistance.

Although this embodiment is illustrated implementing an impedance matching network, one of ordinary skill in the art will appreciate that the impedance matching network may be removed without affecting the scope of the invention.

Figure 8:
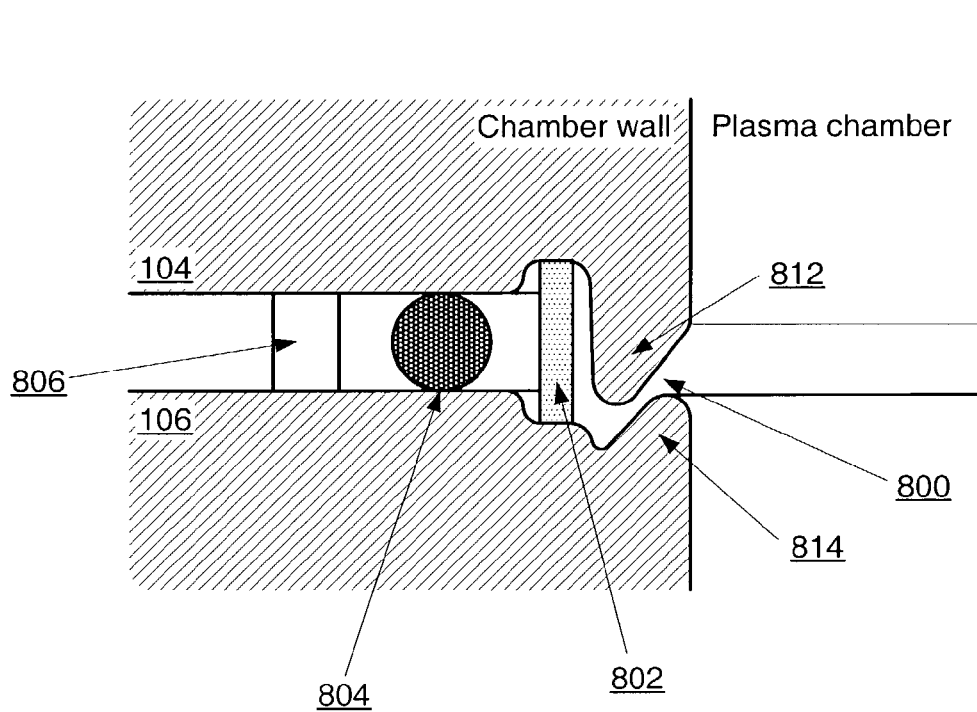
FIG. 8 shows one embodiment of a vacuum seal with extended lifetime.
Figure 9:
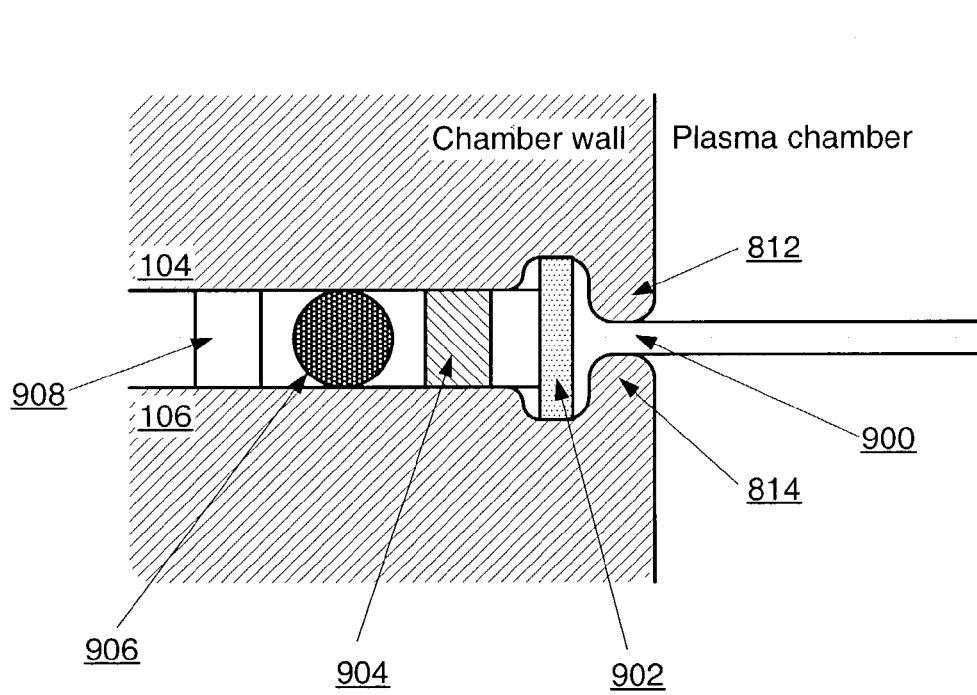
FIG. 9 shows another embodiment of a vacuum seal with extended lifetime.

At each dielectric break a vacuum seal may be created in order to preserve the vacuum integrity of the chamber. The lifetime of the vacuum seal should be comparable to that of the chamber. FIGS. 8 and 9 show two embodiments of a vacuum seal with these characteristics. The seals include the use of an elastic dielectric material. They also include the use of different means to protect the elastic material from direct exposure to the plasma and to reactive gases present inside the plasma chamber. Furthermore, they include the use of elements to ensure a proper compression of the elastic seal, and to avoid its expansion or contraction when the pressures on both sides of the seal are different.

In one embodiment, the protective shield exposed to the plasma can transfer heat to the housing before it gets transferred to the adjoining vacuum seal. In another embodiment, the dielectric break additionally comprises a secondary shield that is concentrically located between the protective shield and the vacuum seal.

As stated above, in steady state operation part of the energy inductively coupled to the plasma is deposited into the walls of the chamber in the form of radiation, ion bombardment and exothermic surface reactions, among others. The metal portions of the chamber, when properly coated and cooled, can be made very resistant to plasma-induced damage. However, the elastic dielectric materials used for the vacuum seals are usually very poor heat conductors, so heat dissipation is very inefficient. Also, they can be susceptible to both direct ion bombardment and attack by reactive species created in the plasma.

FIG. 8 illustrates a dielectric break 108 of a plasma chamber 100 in a first embodiment of the invention. A dielectric break 108 comprises a gap 800, a protective shield 802, a vacuum seal 804, and a spacer 806. This is referred to as the single-shield embodiment. FIG. 9 illustrates a dielectric break 108 of a plasma chamber 100 in a second embodiment of the invention. A dielectric break 108 in the second embodiment comprises a gap 900, a protective shield 902, a secondary shield 904, a vacuum seal 906, and a spacer 908. This is referred to as the double-shield embodiment.

Each component is discussed in more detail below, with specific references made to each embodiment where appropriate.

Gaps 800, 900 are formed from the protrusion 812, 814 of the housing portions 104, 106 when the housing portions 104, 106 are mated. In both embodiments, the gaps 800, 900 formed by the protrusions increase the probability of collision of ions from the plasma against the walls of the gap before reaching the protective shield. FIGS. 8 and 9 show two typical examples of angles between the gaps 800, 900 and the chamber walls, although the invention should not be limited to this.

The protective shield 802, 902 is used to protect the vacuum seal from direct contact with the plasma. The protective shield is located between the first housing 104 and the second housing 106 at the gap 800, 900 of the dielectric break 108. The protective shield should be made of a dielectric material with good thermal characteristics and resistance to ion bombardment and chemical attack, such as a ceramic.

The secondary shield 904 is used in the double-shield embodiment to protect the vacuum seal from the hot protective shield, and to provide enhanced protection against chemical attack by reactive species. It is also beneficial in the case of internally coated vacuum chambers, as explained below. Furthermore, it prevents the elastic vacuum seal from collapsing when the pressure inside the chamber is lower than the pressure outside the chamber. The secondary shield can be made of a chemically resistant dielectric material, such as a polymer.

In the single-shield embodiment, the vacuum seal 804 is adjacent to the high thermal resistant shield 802, and in the double-shield embodiment, the vacuum seal 806 is adjacent to the secondary shield 804. In both embodiments, the vacuum seal provides a closure between the first housing and the second housing when they are mated. The vacuum seal has to be preferably in contact with a smooth area of the bare metal of the chamber to ensure a high quality vacuum seal. In internally coated vacuum chambers, the location of the vacuum seal is a delicate issue from the point of view of mechanical assembling. The vacuum seal has to seat on the uncoated side of the boundary between the coated and uncoated portions of the chamber, so to minimize the exposure of the bare metal to reactive gases while ensuring a high quality vacuum seal. The use of a secondary shield simplifies the assembling since the transition from the coating to the bare metal can be accommodated within the width of the secondary shield. In this case, the secondary shield also protects the uncoated portion of the chamber close to the vacuum seal from chemical attack.

The presence of particles in the plasma chamber may be a serious concern in some areas of plasma processing. A further advantage of the double-shielded embodiment is that offers a high resistance to the escape into the chamber of particles that may be generated by the eventual degradation of the surface of the vacuum seal.

The spacer 806, 908 ensures that the compression of the vacuum seal is within the specifications from the manufacturer. The spacer should be made of a dielectric material with low fragility, structurally apt to withstand the compression that is needed to ensure the closure of the chamber. A polymer with high compression resistance and negligible cold flow over time is an example of such a material.

Some failures in anodic coating can be attributed to high temperatures and cycling experienced by the plasma chamber. To reduce the temperatures in the chamber, cooling tubes are incorporated into the chambers. To improve the thermal contact of the cooling tubes with the aluminum chamber, it was found that cooling tubes that are swaged into the aluminum chamber as described below provide the best thermal resistance.

Figure 10:
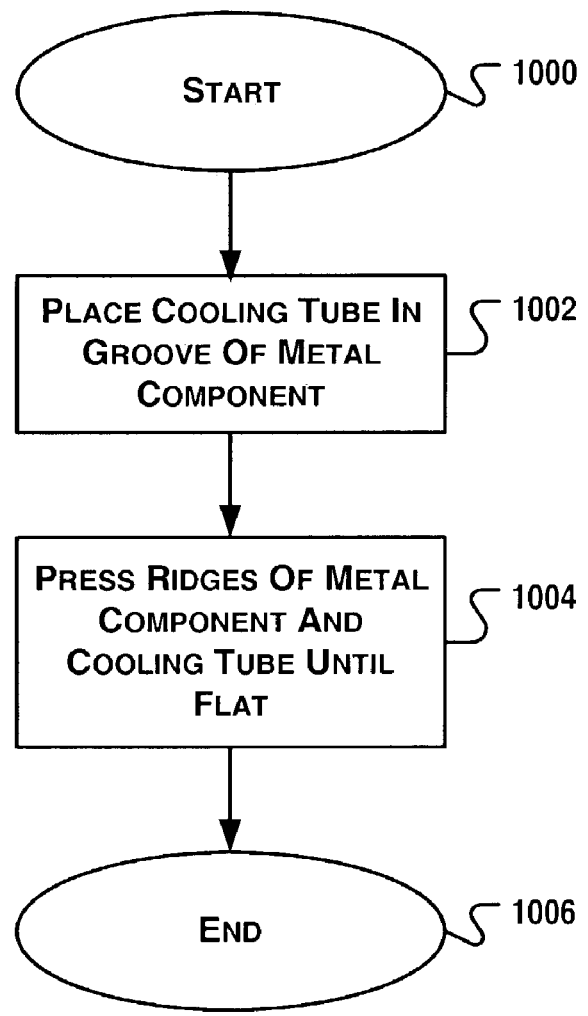
FIG. 10 illustrates a method for placing a cooling tube into a metal component.

FIG. 10 illustrates a method for placing a cooling tube into a metal component within general embodiments of the invention. The method begins at block 1000 and continues to block 1002 where a cooling tube is placed into a groove of a metal component, where the diameter of the cooling tube is approximately equal to the width of the groove towards the surfaces. At block 1004, the two ridges that sit above the first and second surfaces on the metal component are pressed towards the first and second surfaces of the metal component and the cooling tube until the ridges are flush with the surfaces, and a single surface is formed. The method ends at block 1006. The method may additionally comprise fly-cutting the single surface to smooth out the surface, as well as coating the inner surface of the groove with a filler material.

Figure 11:
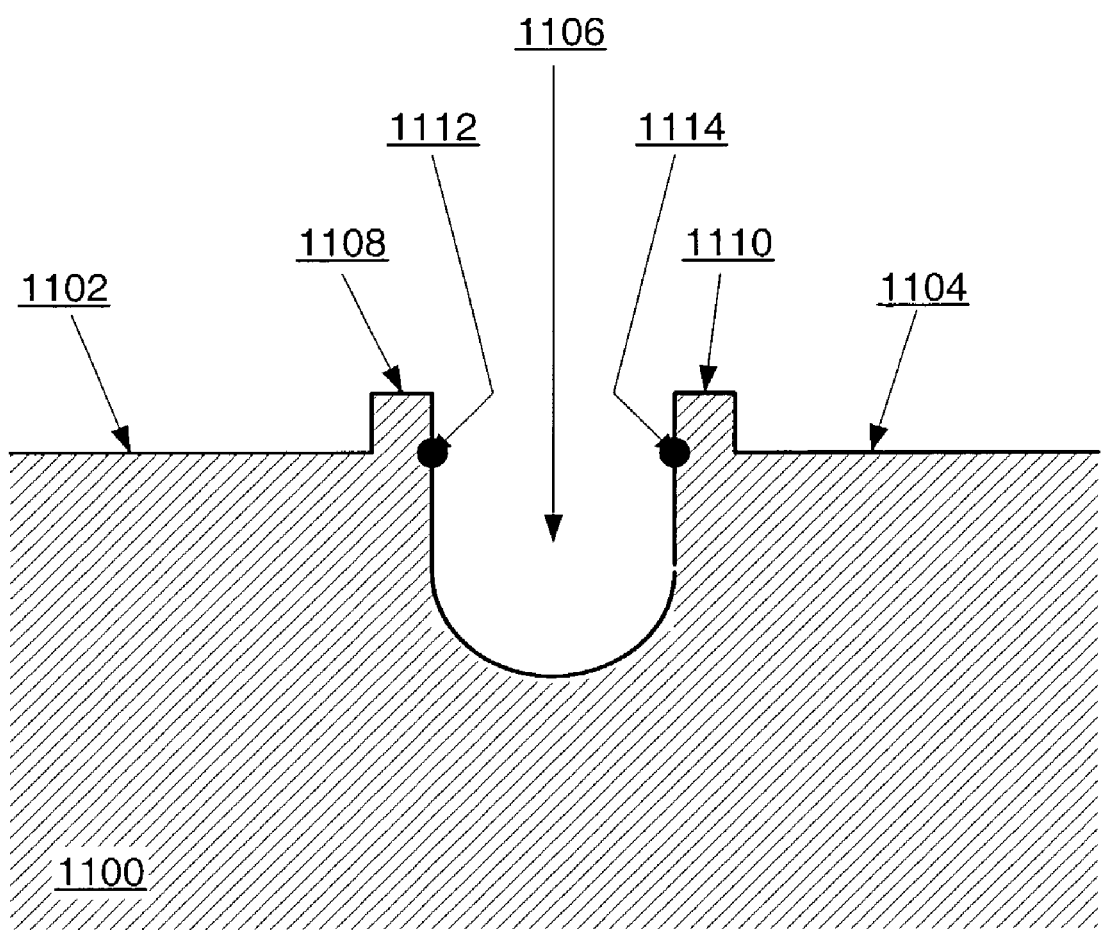
FIG. 11 illustrates a cross section of a region of the metal component prepared to receive the cooling tube for cooling the metal component.

FIG. 11 illustrates a cross section of a region of the metal component 1100 prepared to receive the cooling tube for cooling the metal component. The metal component comprises two surfaces 1102, 1104, a groove 1106, and at least one ridge 1108, 1110 (two illustrated), as described below.

A groove 1106 lies between the two surfaces 1102, 1104. The groove 1106 begins at the point 1112, curves into the metal component 1100 and towards the point 1114, and ends at the point 1114. While the groove has been described with respect to the points on the surfaces, it should be understood that a groove as discussed herein retains its normal definition as an indentation from a surface. Therefore, although the metal component is described as having two surfaces, the metal component may alternately be described as having a single surface having a groove located therein. However, because additional features are described, the description having two surfaces better illustrates embodiments of the invention.

Figure 12:
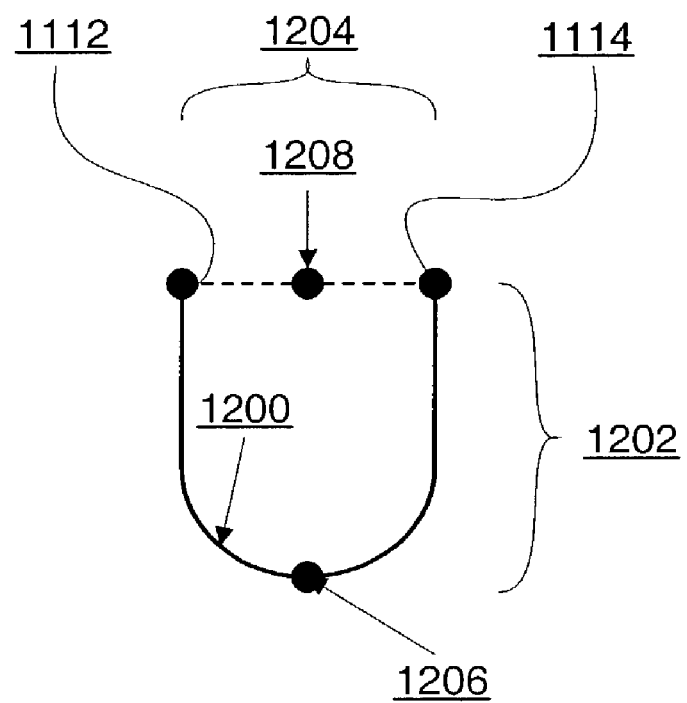
FIG. 12 shows a detail of the groove where the cooling tube is to be placed.

As illustrated in FIG. 12, the groove 1106 comprises an inner surface 1200. In illustrated embodiments, the depth 1202 of the groove is slightly smaller than the diameter of a cooling tube to be placed therein, so as to enable the deformation of metal from the ridges onto the cooling tube. The depth of the groove 1202 may be measured from the midpoint 1206 of the groove bottom to an imaginary midpoint 1208 between the point 1112 and the point 1114.

The width 1204 of the groove at the surfaces is approximately equal to the diameter of the cooling tube to be placed therein, so as to be able to place a cooling tube therein without force, and so as to leave as small a gap as possible between the inner surface 1200 of the groove 1106 and the cooling tube (see discussion below). For example, if the diameter of a cooling tube is 0.375", then the width of the groove at the surface is approximately 0.375"–0.380".

Alternatively, it is contemplated that the width 1204 of the groove at the surface may be smaller than the diameter of a cooling tube to be placed within, but that the surfaces also comprise at least one ridge as illustrated in FIG. 11. In this embodiment, a cooling tube is pressed into a groove (to sit below an undercut joint, for instance), and is then swaged into place by the at least one groove.

Although illustrated embodiments show a groove having a width at the surface approximately equal to the width of the groove at the bottom, it should be understood that such dimensions are approximate and for illustration purposes only, and are not intended to be limiting on the invention.

Referring back to FIG. 11, metal component 1100 comprises at least one ridge, although illustrated embodiments show two ridges. A first ridge 1108 extends upwards in a vertical direction from point 1112 of the first surface 1102, and a second ridge 1110 extends upwards in a vertical direction from point 1114 of the second surface 1104. In embodiments shown, the ridges 1108, 1110 extend at 90-degree angles from their respective surfaces 1102, 1104, and the ridge tops are flat. However, the invention is not so limited, and the ridges may extend at non-perpendicular angles, and the ridge tops may be curved, or pointed, for example.

Where the ridge extends from around the point 1112, or from around the point 1114, the ridge may extend from these points directly, or the ridge may extend from a point near these points. As illustrated, the first ridge 1108 extends from point 1112, and the second ridge 1110 extends from point 1114. In this embodiment, the inner surface of the ridges 1108, 1110 extend from the inner surface of groove 1106.

Figure 13:
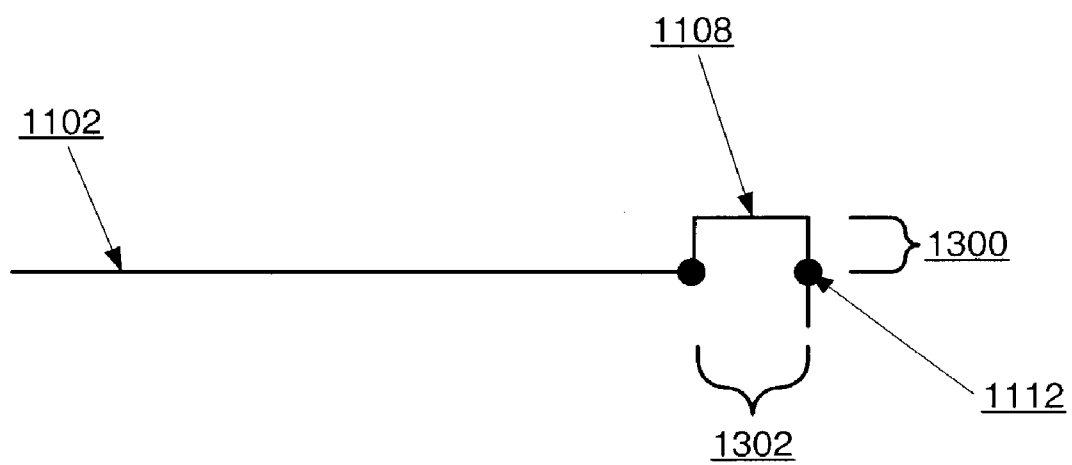
FIG. 13 shows a detail of one ridge adjacent to the groove depicted in FIG. 12.

As illustrated in FIG. 13, the first and second ridges 1108, 1110 (only one 1108 shown) each have a height 1300 from their respective surfaces that is measured from the surfaces, and a thickness 1302. The height and thickness (along with groove depth 1202) are parameters that determine the amount of crush of the cooling tube, as well as the amount of aluminum moved over the tubing. These parameters impact the resulting cross section of the tube, which in turn impacts the pressure drop of fluid flowing through the tube—see discussion below. In an exemplary embodiment, the height of the ridges is approximately 8.5% of the outer diameter of the cooling tube. Thus, if the cooling tube has a diameter of 0.375", then the height of the ridges is approximately 0.032", and the thickness may be approximately 0.063", for example.

Although metal component 1100 is shown as having two ridges, it is contemplated that embodiments of the invention may comprise a single ridge for manufacturing reasons. For example, where the cooling tube is near the edge of the metal component, and the surface of the metal component needs to be protected, there may be a desire to omit a ridge from that surface, such that a single ridge is formed from the other surface.

Figure 14:
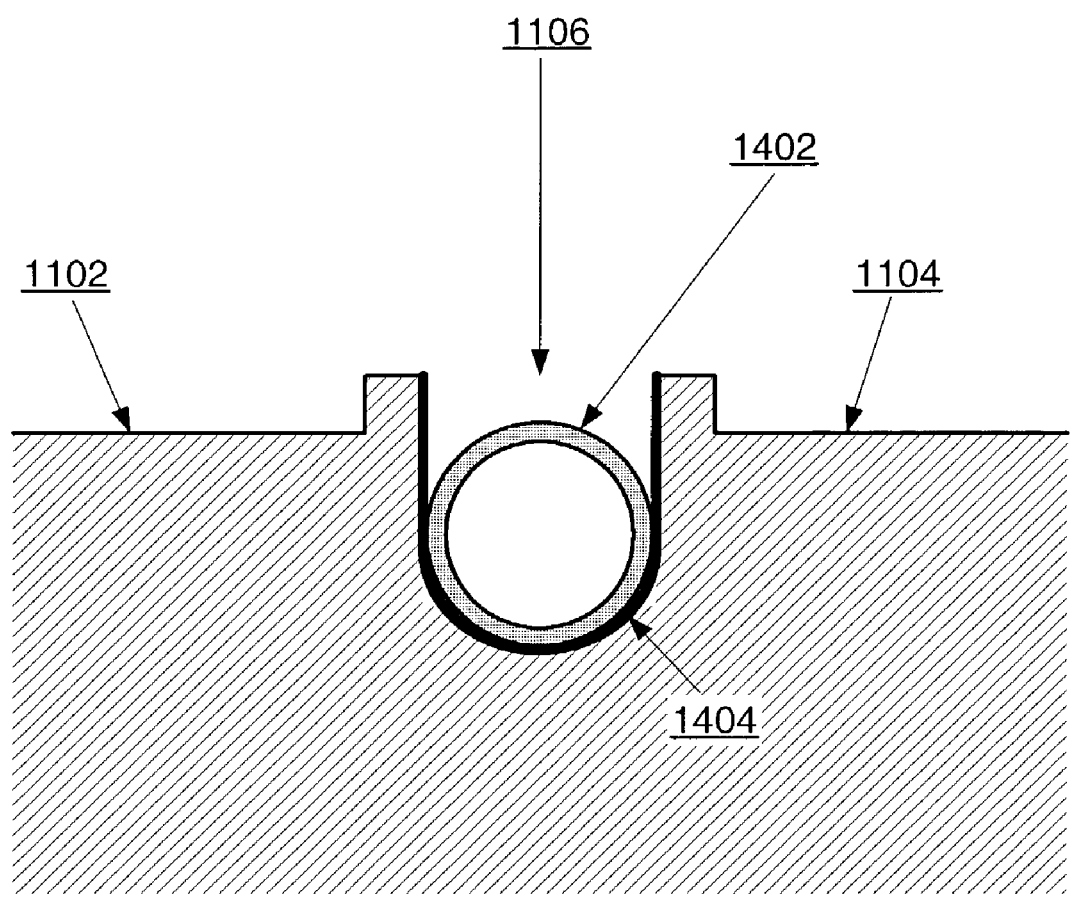
FIG. 14 illustrates a cross section of the material and the cooling tube placed in the groove, prior to swaging.

FIG. 14 illustrates a cross section of the material 1100 and the cooling tube 1402 placed in the groove 1106, prior to swaging. While the ridges are illustrated as extending above the surfaces as well as the cooling tube, there is no requirement that the ridges extend above the cooling tube, so long as the ridges extend above the surfaces. As illustrated, the thickness of the wall of the cooling tube before swaging is uniform. The outer diameter of the tube is approximately equal to the width 1204 of the groove 1106 into which it is placed.

Figure 15:
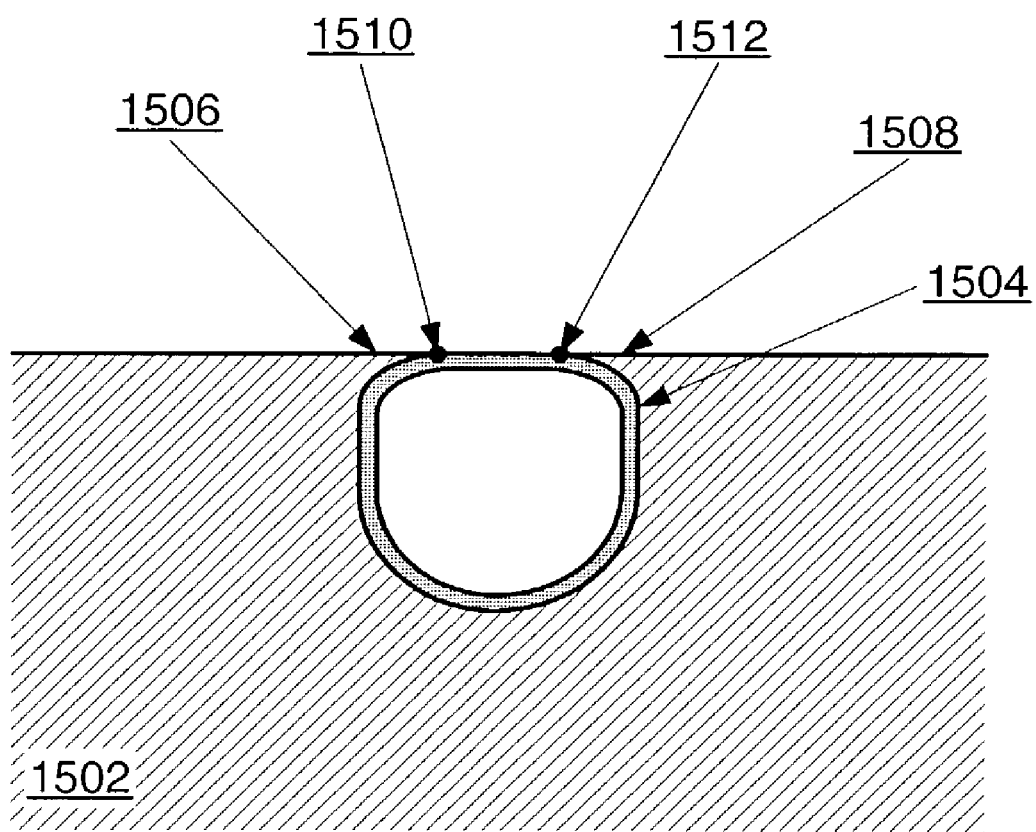
FIG. 15 is one cross section of a processed metal cooling system in which the cooling tube has been swaged into place.

FIG. 15 is a cross section of a processed metal cooling system in which the cooling tube has been swaged into place. The system comprises a processed metal component 1502, a swaged cooling tube 1504, and deformed metal 1506, 1508. The swaged cooling tube 1504 is a cooling tube 1402 that has been swaged into the groove 1106 of the metal component 1100. As a result of the swaging process, the thickness of the wall of the swaged tube may not be uniform. In particular, the thickness of the upper wall may be smaller than the original thickness of the tube prior to swaging. In some cases, the swaging process may modify the thickness of the other portions of the wall as well. However, these dimensions may also remain the same, depending on the amount of pressure that is put on the cooling tube, which is a function of the ridge height and the groove depth, as discussed above.

Figure 16:
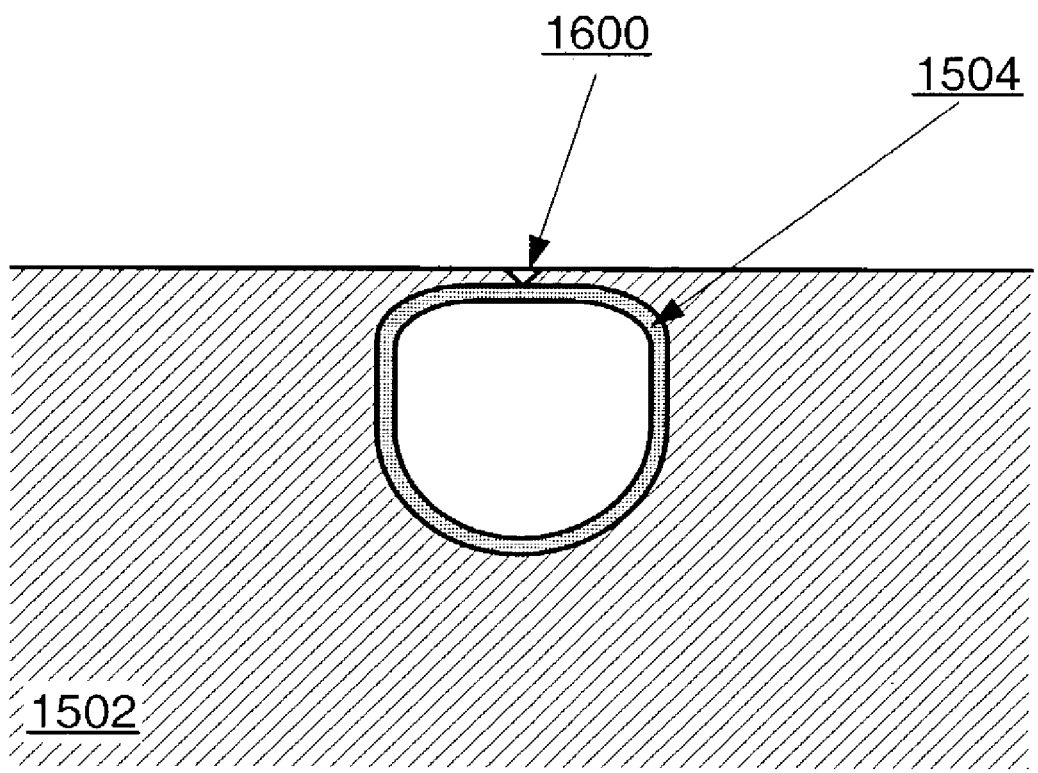
FIG. 16 is another cross section of a processed metal cooling system in which the cooling tube has been swaged into place.

Deformed metal 1506, 1508 is formed by pressing the ridges 1108, 1110 of metal component 1100 onto the cooling tube 1402. When the cooling tube 1402 is swaged into place, the two ridges 1108, 1110 on the metal component 1100 are pressed into and around the cooling tube 1402, causing the two ridges 1108, 1110 to deform around the cooling tube 1402. As illustrated in FIG. 16, the ridges may form enough metal over the cooling tube as to cover the entire top of the cooling tube, and only a single seam 1600 is formed. Otherwise, as illustrated in FIG. 15, two seams 1510, 1512 are formed.

Referring back to FIG. 14, the system may additionally comprise filler material 1404 to improve the heat transfer between the metal component 1100 and cooling tube 1402. Filler material 1404 may comprise epoxy, thermal adhesive, or grease joint, for example. The filler material 1404 is applied to the inner surface 1200 of the groove 1106 so that when the cooling tube 1402 is placed into the groove 1106, the filler material 1404 sits between the inner surface 1200 of the groove 1106 and the outer surface of the cooling tube 1402. Once the cooling tube 1402 has been swaged into place, the filler material 1404 fills most, if not all, air gaps that may exist between the swaged cooling tube 1504 and the inner surface 1200 of the groove 1106.

General Matters

In the description above, for the purposes of explanation, numerous specific details are set forth in order to provide a thorough understanding of the present invention. It will be apparent, however, to one skilled in the art that the present invention may be practiced without some of these specific details. In other instances, well-known circuits, structures, devices, and techniques have been shown in block diagram form or without detail in order not to obscure the understanding of this description.

The present invention includes various steps, but steps can be added to or deleted from any of the methods and signal or messages can be added or subtracted from any of the described steps or control lines without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

What is claimed is:

1. A plasma chamber, comprising:
   a first housing portion;
   a second housing portion mated to the first housing portion;
   a plurality of dielectric breaks between the first housing portion and the second housing portion;
   a first transformer located on a region of the chamber next to a first one of the plurality of dielectric breaks; and
   a second transformer located on a region of the chamber next to a second one of the plurality of dielectric breaks.

2. The plasma chamber of claim 1, wherein each dielectric break comprises:
   a gap formed between the first housing portion and the second housing portion of the plasma chamber;
   a protective shield located between the first housing and the second housing at the gap;
   a vacuum seal located between the first housing and second housing, the vacuum seal to create a closure between the first housing and the second housing when they are mated; and
   a spacer located between the first housing and the second housing, the spacer to set a compression for the vacuum seal.

3. The plasma chamber of claim 2, wherein the vacuum seal is adjacent to and concentrically aligned with the protective shield, and the spacer is adjacent to and concentrically aligned with the vacuum seal.

4. The plasma chamber of claim 2, additionally comprising a secondary shield that is adjacent to the protective shield on one side, and adjacent to the vacuum seal on the opposite side, and the secondary shield is used to protect the vacuum seal from heat generated from the protective shield.

5. The plasma chamber of claim 4, wherein the vacuum seal is adjacent to and concentrically aligned with the secondary shield, the spacer is adjacent to and concentrically aligned with the vacuum seal, and the secondary shield is additionally concentrically aligned with the protective shield.

6. The plasma chamber of claim 2, wherein the chamber is made with an aluminum alloy having low concentrations of elements that form non-soluble intermetallic particles.

7. The plasma chamber of claim 6, wherein the non-soluble intermetallic particles comprise iron, manganese, silicon, and chromium.

8. The plasma chamber of claim 6, the first and second housing portions additionally having a protective anodic layer on top of the aluminum alloy.

9. The plasma chamber of claim 8, the first and second housing portions additionally having a protective layer coated on top of the anodized alloy.

10. The plasma chamber of claim 1, additionally comprising at least one cooling tube in a section of the chamber, the section having:
    a top surface formed by swaging two ridges on the metal component onto a cooling tube, the cooling tube prior to swaging having a first wall thickness;
    a groove that extends into the metal component from the top surface, and holding the cooling tube;
    the cooling tube having an upper wall, a bottom wall, and two side walls, the cooling tube having been placed into the groove, the cooling tube having an upper wall thickness less than the first wall thickness; and
    deformed metal around each side of the groove, the deformed metal formed by the two ridges being swaged into the cooling tube.

11. The plasma chamber of claim 1, additionally comprising at least one cooling tube in a section of the chamber, the section having:
    a first surface having a first outer point and a second inner point;
    a second surface having a third inner point and a fourth outer point;
    a groove located between the first and second surfaces, the groove having an inner surface that extends into the metal component and that begins at the second inner point and ends at the third inner point;
    a first ridge that extends in a positive, vertical direction from around the second inner point and from a fifth point located between the first outer point and the second inner point the first ridge having a height measured from the first surface; and
    a second ridge that extends in a positive, vertical direction from around the third inner point and from a sixth point located between the fourth outer point and the third inner point, the second ridge having a height measured from the second surface.

12. A plasma chamber, comprising:
    a first housing portion that is made with an aluminum alloy having low concentrations of elements that form non-soluble intermetallic particles;
    a second housing portion mated to the first housing portion that is made with an aluminum alloy having low concentrations of elements that form non-soluble intermetallic particles selected in a group consisting of iron, manganese, silicon, and chromium;
    a plurality of dielectric breaks between the first housing portion and the second housing portion, wherein each dielectric break comprises:
    a gap formed between a first housing portion and a second housing portion of the plasma chamber;
    a protective shield located between the first housing and the second housing at the gap;
    a vacuum seal located between the first housing and second housing, the vacuum seal to create a closure between the first housing and the second housing when they are mated; and
    a spacer located between the first housing and the second housing, the spacer to set a compression for the vacuum seal;
    at least one transformer; and
    a section of the chamber having:
    a first surface having a first outer point and a second inner point;
    a second surface having a third inner point and a fourth outer point;
    a groove located between the first and second surfaces, the groove having an inner surface that extends into the metal component, and that begins at the second inner point and ends at the third inner point;
    a first ridge that extends in a positive, vertical direction from around the second inner point and from a fifth point located between the first outer point and the second inner point, the first ridge having a height measured from the first surface; and
    a second ridge that extends in a positive, vertical direction from around the third inner point and from a sixth point located between the fourth outer point and the third inner point, the second ridge having a height measured from the second surface.

13. The plasma chamber of claim 12, the first and second housing portions additionally having a protective anodic layer on top of the aluminum alloy.

14. The plasma chamber of claim 13, the first and second housing portions additionally having a protective coating on top of the anodized aluminum alloy.

15. The plasma chamber of claim 12, wherein the non-soluble intermetallic particles comprise iron, manganese, silicon, and chromium.

16. A plasma chamber, comprising:
   a first housing portion that is made with an aluminum alloy having low concentrations of elements that form non-soluble intermetallic particles;
   a second housing portion mated to the first housing portion that is made with an aluminum alloy having low concentrations of elements that form non-soluble intermetallic particles selected in a group consisting of iron, manganese, silicon, and chromium;
   a plurality of dielectric breaks between the first housing portion and the second housing portion; and
   at least one transformer.

17. The plasma chamber of claim 16, the chamber additionally comprising a section of the chamber having:
   a first surface having a first outer point and a second inner point;
   a second surface having a third inner point and a fourth outer point;
   a groove located between the first and second surfaces, the groove having an inner surface that extends into the metal component, and that begins at the second inner point and ends at the third inner point;
   a first ridge that extends in a positive, vertical direction from around the second inner point and from a fifth point located between the first outer point and the second inner point, the first ridge having a height measured from the first surface; and
   a second ridge that extends in a positive, vertical direction from around the third inner point and from a sixth point located between the fourth outer point and the third inner point, the second ridge having a height measured from the second surface.

18. The plasma chamber of claim 17, wherein the first ridge extends in a positive, vertical direction from the second inner point and a fifth point, and the second ridge extends in a positive vertical direction from the third inner point and a sixth point.

19. The plasma chamber of claim 17, additionally comprising a filler material that is applied on the wall of the groove.

20. The plasma chamber of claim 17, wherein the filler material comprises a thermally conductive adhesive.

21. The plasma chamber of claim 17, wherein each dielectric break comprises:
   a gap formed between a first housing portion and a second housing portion of the plasma chamber,
   a protective shield located between the first housing and the second housing at the gap;
   a vacuum seal located between the first housing and second housing, the vacuum seal to create a closure between the first housing and the second housing when they are mated; and
   a spacer located between the first housing and the second housing, the spacer to set a compression for the vacuum seal.

22. The plasma chamber of claim 21, wherein the vacuum seal is adjacent to and concentrically aligned with the protective shield, and the spacer is adjacent to and concentrically aligned with the vacuum seal.

23. The plasma chamber of claim 16, wherein the non-soluble intermetallic particles comprise iron, manganese, silicon, and chromium.

24. A plasma chamber, comprising:
   a first housing portion;
   a second housing portion mated to the first housing portion;
   a section of the chamber having;
   a first surface having a first outer point and a second inner point;
   a second surface having a third inner point and a fourth outer point;
   a groove located between the first and second surfaces, the groove having an inner surface that extends into the metal component and that begins at the second inner point and ends at the third inner point;
   a first ridge that extends in a positive, vertical direction from around the second inner point and from a fifth point located between the first outer point and the second inner point, the first ridge having a height measured from the first surface; and
   a second ridge that extends in a positive, vertical direction from around the third inner point and from a sixth point located between the fourth outer point and the third inner point, the second ridge having a height measured from the second surface;
   a plurality of dielectric breaks between the first housing portion and the second housing portion, wherein each dielectric break comprises:
   a gap formed between a first housing portion and a second housing portion of the plasma chamber;
   a protective shield located between the first housing and the second housing at the gap;
   a vacuum seal located between the first housing and second housing, the vacuum seal to create a closure between the first housing and the second housing when they are mated; and
   a spacer located between the first housing and the second housing, the spacer to set a compression for the vacuum seal; and
   at least one transformer.

25. A plasma chamber, comprising:
   a fist housing portion;
   a second housing portion mated to the first housing portion; and
   a plurality of dielectric breaks between the first housing portion and the second housing portion, each dielectric break including a gap formed between the first housing portion and the second housing portion of the plasma chamber, a protective shield located between the first housing and the second housing at the gap, a vacuum seal located between the first housing and second housing, the vacuum seal to create a closure between the first housing and the second housing when they are mated, and a spacer located between the first housing and the second housing, the spacer to set a compression for the vacuum seal.

26. The plasma chamber of claim 25, additionally comprising at least one transformer located between dielectric breaks of the plurality of dielectric breaks.

27. The plasma chamber of claim 26, wherein the first transformer is located on a region of the chamber next to a first one of the plurality of dielectric breaks, the plasma chamber additionally comprising a second transformer located next to a second one of the plurality of dielectric breaks.

28. The plasma chamber of claim 25, wherein the vacuum seal is adjacent to and concentrically aligned with the protective shield, and the spacer is adjacent to and concentrically aligned with the vacuum seal.

29. The plasma chamber of claim 28, additionally comprising a secondary shield that is adjacent to the protective shield on one side, and adjacent to the vacuum seal on the opposite side, and the secondary shield is used to protect the vacuum seal from heat generated from the protective shield.

30. The plasma chamber of claim 29, wherein the vacuum seal is adjacent to and concentrically aligned with the secondary shield, the spacer is adjacent to and concentrically aligned with the vacuum seal, and the secondary shield is additionally concentrically aligned with the protective shield.

* * * * *